Sept. 11, 1962 M. B. STEARNS 3,053,923

SOLAR POWER SOURCE

Filed July 31, 1959

Inventor
MARY BETH STEARNS
By Soans, Anderson, Luedeka & Fitch
Att'ys

United States Patent Office 3,053,923
Patented Sept. 11, 1962

3,053,923

SOLAR POWER SOURCE

Mary Beth Stearns, San Diego, Calif., assignor to General Dynamics Corporation, New York, N.Y., a corporation of Delaware Filed July 31, 1959, Ser. No. 830,877
4 Claims. (Cl. 136—4)

The present invention relates to power sources, and in particular to an improved power source for converting solar energy into electrical energy.

The simplest previously available means of harnessing the free and inexpensive energy of the sun has been through the use of batteries of silicon solar cells. While silicon solar cells have proven to be relatively efficient in converting solar energy into electrical energy, they require a relatively large amount of high purity semiconductor material for a given power output. Thus such solar cells are relatively costly and have a relatively high weight-to-output power ratio. Moreover, silicon solar cells require a surface temperature of about 70° F. to re-radiate wasted energy and, therefore, in certain applications, require surface cooling.

An object of the present invention is the provision of an improved solar power source. Another object is the provision of a relatively inexpensive solar power source. Still another object is the provision of a solar power source which has a relatively low weight-to-output power ratio.

Other objects and advantages of the present invention will become apparent by reference to the following description and accompanying drawings.

A solar power source in accordance with the present invention includes a first surface for absorbing solar energy and converting it into thermal energy, and a second surface spaced from the absorbing surface for radiating energy. At least one pair of dissimilar thermoelectric elements is disposed between and connected to both the absorbing surface and the radiating surface. Conductors are provided for connecting the thermoelectric elements to an external load.

Basically, the present solar power source converts solar energy into electrical energy through the use of the thermoelectric, or the Seebeck. The Seebeck effect is the electromotive force developed in an open circuit when the circuit is formed by joining two dissimilar conductors at two places and one of the junctions is at a higher temperature than the other.

Figure 1:
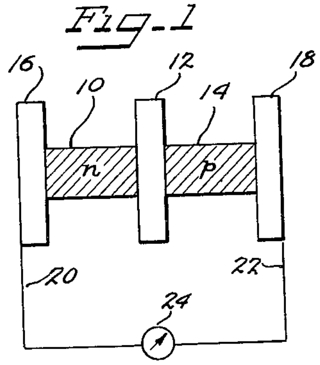
FIGURE 1 is a schematic view of a single junction of two thermoelectric elements.

This effect is illustrated in FIGURE 1 wherein a semiconductor bar 10 having an excess of electrons (n-type) is joined by an inner connector 12 of a good electrical and thermal conductive material, which is at a temperature $T_h$, to a semiconductor bar 14 having a deficiency of electrons (p-type). Outer connectors 16 and 18 of conductive material, which are at a lower temperature $T_c$ than the temperature $T_h$ of the inner connector 12, are connected to the other ends of the n-type and p-type semiconductor bars 10 and 14. The bars 10 and 14, in turn, are connected by means of conductors 20 and 22, respectively, to a load 24. For purposes of illustration, the load 24 is shown as a meter.

By maintaining the inner connector 12 (hot junction) at a higher temperature than the outer connectors 16 and 18 (cold junction), a current is caused to flow through the meter 24. The power output depends upon the semiconductor materials used and the temperature differential between the hot junction and the cold junction.

Figure 2:
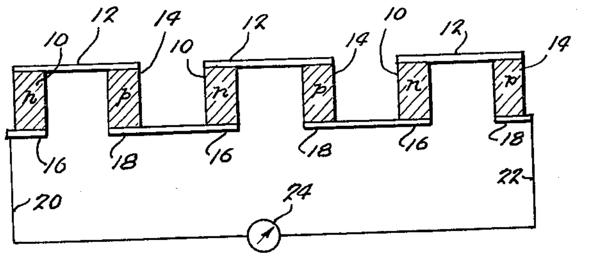
FIGURE 2 is a schematic view of a group of the junctions shown in FIGURE 1 arranged in series.

To increase the voltage output, a plurality of the junctions of the pairs of dissimilar semiconductor bars 10 and 14 may be connected in series, as shown in FIGURE 2. In this way, the voltage output is approximately equal to the sum of the voltage outputs from the single pairs of dissimilar semiconductors, and the current output is approximately equal to the current of a single pair of semiconductors. Pairs of dissimilar semiconductor bars may also be connected in parallel to increase the current output or, in the alternative, groups of series connected junction pairs may be arranged in parallel.

Basically, in the present invention solar radiation strikes one of the junctions between a pair of dissimilar thermoelectric elements and is converted into thermal energy which, in turn, maintains that junction at a high temperature. Energy is permitted to be radiated from the other junction of the thermoelectric elements thus permitting this junction to be maintained at a lower temperature than the hot junction.

It should be realized that a solar power source may be utilized either on earth or in space. Since the features desired in power sources used in space differ from those desired of power sources used at the earth's surface, the specific construction of the solar power source may depend upon where it is to be utilized. For instance, a low weight-to-power ratio is of prime importance in a solar power source for use in space, while an inexpensive solar power source s desirable for use on earth.

Figure 3:
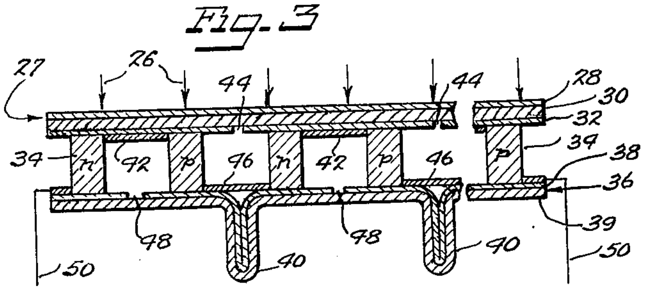
FIGURE 3 is a schematic sectional view of a solar power source in accordance with the present invention.

A solar power source particularly designed for use in space, which is constructed in accordance with the present invention, is shown in FIGURE 3 and is described hereinafter. For purposes of illustration, the thicknesses of the materials shown in the drawings are exaggerated.

In the illustrated embodiment, the solar power source is disposed so that one surface thereof is generally perpendicular to the solar radiation (indicated by the arrows 26). For purposes of explanation, this one surface is referred to as the upper surface and the opposite surface of the solar power source is referred to as the lower surface.

The impinging solar radiation is converted into thermal energy by a three layer absorbing sheet 27, the uppermost layer 28 of which is composed of a material having a high absorptive power for the solar spectrum and a low thermal emissivity, such as molybdenum, tungsten, tantalum, etc. In order to keep the weight of the solar power source as low as possible, the uppermost layer 28 is made no thicker than that necessary to effectively absorb the solar radiation.

For example, when the uppermost layer is composed of molybdenum having a thickness in the order of a few tenths of a micron, approximately 47 percent of the impinging solar radiation is absorbed, the remaining solar radiation being reflected. Approximately 90 percent of the absorbed radiation is converted into thermal energy in the molybdenum layer and the remaining 10 percent of the absorbed radiation is re-radiated. Therefore, about 42 percent of the total impinging solar radiation may be retained by the uppermost layer 28.

The thickness of the uppermost layer 28 may be reduced to such an extent that it has a high transparency to the solar spectrum but a low transparency to the thermal spectrum. By utilizing such a film for the uppermost layer 28, the amount of solar energy retained by the absorbing sheet 27 is increased since the layer 28 prevents re-radiation of solar energy that has passed therethrough.

In the illustrated embodiment, structural strength is provided for the absorbing sheet 27 by an intermediate layer or sheet 30 of tough, lightweight, thermally stable, synthetic material such as polyethylene terephthalate resin, sold under the trademark "Mylar." The intermediate layer 30 is heated to approximately the same temperature as the uppermost layer 28 by the heat absorbed in the layer 28.

A lower layer or reflecting coating 32 of lightweight metal having a low thermal emissivity and a high thermal conductivity is disposed on the lower surface of the sheet 30 in order to reduce the thermal radiation from the sheet 30 and also to thermally conduct heat from the surface of the sheet 30 to a plurality of thermoelectric elements 34. The reflecting coating 32 is made of sufficient thickness to effectively conduct the heat developed therein to the thermoelectric elements 34 without an excessive temperature drop.

A plurality of pairs of spaced apart thermoelectric elements 34 are suitably connected, by soldering or such, to the lower layer 32. A pair of elements 34 includes an n-type semiconductor element connected to a p-type semiconductor element. The n-type and p-type elements 34 are composed of suitable thermoelectric semiconductor materials, such as a mixture comprising approximately 80 percent to 90 percent of tetradymite ($Bi_2Te_3$) and substantially the remainder being castillite ($Bi_2Se_3$). The mixture is doped with bismuth to provide n-type elements, and copper bromide to provide p-type elements.

Thermal energy is radiated from the lower ends of the thermoelectric elements 34 by an emitting sheet 36 which includes an upper layer or reflecting coating 38 and a lower layer or sheet 39. The upper layer 38 is composed of metal having a high thermal conductivity, which may be identical with the lower layer 32 of the absorbing sheet 27, for conducting heat from the thermoelectric elements 34 to a wide area. The thermoelectric elements 34 are suitably connected to the upper layer 38 by soldering or such.

The lower layer 39 provides structural strength for the emitting sheet 36 and may be composed of a material identical with that of the intermediate layer 30 of the absorbing sheet 27. In order to increase the radiative power of the lower layer 39, the lower layer 39 is preferably impregnated with a material which has a high emissivity at the temperature of the cold junction, such as lampblack. Of course, the radiative power may also be increased by coating the lower surface of the lower layer 39 with a high emissivity material, such as a lampblack coating.

The emitting sheet 36 is made with a geometry such that its exterior surface area is greater than the surface area of the absorbing sheet 27 so that it will operate at a lower temperature than the absorbing sheet 27.

In the illustrated embodiment, the geometry of the emitting sheet 36 is made such that its outer surface area is approximately two times the surface area of the absorbing sheet 27. This may be accomplished by folding the emitting sheet 36 to provide radiating fins 40, as illustrated in FIGURE 3.

The spacing of the thermoelectric elements 34 is determined by the operating temperature of the absorbing sheet 27 required for proper operation of the selected thermoelectric material. Preferably, for the most efficient conversion of thermal energy into electrical energy, the area of the absorbing sheet 27 associated with each element 34 is made of such a size that it is heated by solar radiation to approximately the maximum allowable hot junction temperature for the thermoelectric material utilized. It should be realized that the hot junction is affected by the cold junction temperature, and the material, cross sectional area and length of the thermoelectric elements.

A hot junction is formed by connecting one of the n-type thermoelectric elements 34 to one of the p-type thermoelectric elements 34 at the lower layer 32 of the absorbing sheet 27. While the connection may be formed by the metallic lower layer 32, in the illustrated embodiment, in order to keep the resistance of the hot junction connection small compared to the internal resistance of the thermoelectric elements 34, the connection is made by means of conductive wires 42 suitably connected, as by soldering or such, to the upper ends of the thermoelectric elements 34. However, if thermoelectric elements with increased resistance are utilized, the metallic lower layer 32 may be used for the connection.

In order to prevent short circuits between pairs of thermoelectric elements 34, the metallic lower layer 32 is cut away between hot junctions, as indicated by the reference numeral 44. The metallic layer 32 may be cut away during the process in which the layer of metal is coated on the intermediate layer 30.

Various connections may be made between the pairs of thermoelectric elements 34 to obtain various voltages and currents. For instance, a plurality of pairs of thermoelectric elements 34 may be connected in series so that the voltages add together to provide a relatively high voltage, low current source. However, if a high current, low voltage source is desired, the elements may be connected in parallel. In the illustrated embodiment, the connections between pairs of thermoelectric elements 34 are made by conductive wires 46 suitably connected, as by soldering or such, to the lower ends of the thermoelectric elements 34.

The metallic reflecting layer 38 of the emitting sheet 36 is suitably cut away, as indicated by the reference numeral 48, to prevent short circuits between pairs of thermoelectric elements 34.

The pairs of thermoelectric elements 34 are connected to an external load (not shown) by means of conductors 50.

In one embodiment of the solar power source designed for use in space, the absorbing sheet 27 included a $0.6\times10^{-3}$ centimeter thick intermediate layer 30 of polyethylene terephthalate resin, coated on one side with a $0.2\times10^{-4}$ centimeter coating of molybdenum and on the other side with a $0.3\times10^{-3}$ centimeter coating of aluminum. The thermoelectric elements 34 were composed of a mixture comprising approximately 80 to 90 percent tetradymite ($Bi_2Te_3$) and approximately 20 to 10 percent of castillite ($Bi_2Se_3$). The mixture was doped with bismuth to provide n-type elements, and copper bromide to provide p-type elements. The elements 34, which were 0.5 mm. by 0.5 mm. in cross section and were 0.9 mm. long, were disposed 1 centimeter apart on the absorbing sheet 27. The emitting sheet 36 included a $0.6\times10^{-3}$ centimeter thick lower layer 39 of polyethylene terephthalate resin coated on one side with a $0.3\times10^{-3}$ centimeter coating of aluminum.

A solar power source constructed as described above, has a power output of approximately 2 watts/square foot, a weight-to-power output ratio of approximately 3.2 grams/watt and an efficiency of 4 percent. With improved thermoelectric material the weight-to-power output ratio and the efficiency may be further improved.

Figure 4:
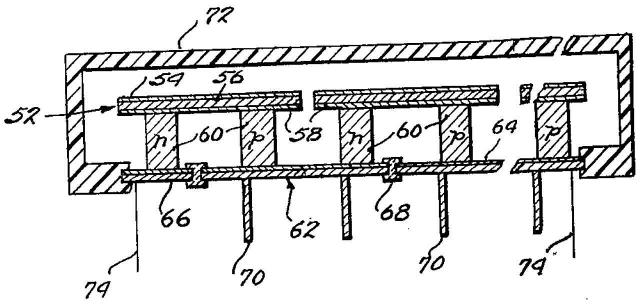
FIGURE 4 is a schematic sectional view of another embodiment of the solar power source.

A solar power source designed for use in the earth's atmosphere utilizing the principles of the present invention, is shown in FIGURE 4. As illustrated, the earth's solar power source includes a three layer absorbing sheet 52, the upper layer 54 of which is composed of a material which has a high absorptive power for the solar spectrum and a low thermal emissivity, such as molybdenum, tungsten, etc.

Structrural strength is provided for the upper layer 54 of the absorbing sheet 52 by an intermediate layer 56 composed of a metal which has a high thermal conductivity, such as copper, aluminum, etc. Since the material used for the intermediate layer absorbs the solar spectrum to a certain degree, a solar power source of reduced efficiency may be constructed by eliminating the upper layer 54.

In order to reduce the amount of radiation from the intermediate layer 56, a lower layer 58 of a metal having a low thermal emissivity, such as shiny aluminum, is provided. Of course, if the lower surface of the material utilized for the intermediate layer 56 can be polished sufficiently to reduce radiation, the lower layer may be eliminated.

A plurality of pairs of dissimilar semiconductor thermoelectric elements 60 are suitably connected, as by soldering, etc., to the lower surface of the absorbing sheet 52. Since the absorbing sheet 52 is composed of metal, the absorbing sheet serves as a connector between dissimilar elements 60 to form hot junctions. In order to prevent short circuits between hot junctions, the absorbing sheet 52 is separated into a plurality of segments as shown in FIGURE 4.

In the illustrated embodiment, a two-layer emitting sheet 62 is suitably connected, as by soldering, etc., to the lower ends of the elements 60. The upper layer 64 of the emitting sheet 62 is composed of a metal which has a low thermal emissivity, such as evaporated aluminum, etc., and the lower layer 66 is composed of metal having a high thermal conductivity, such as copper, aluminum, etc. Of course, if the lower layer 66 is made of a material which may be polished to reduce radiation, the upper layer 64 may be eliminated.

The metallic emitting sheet 62 serves as a connector between pairs of elements 60. In order to prevent short circuits between element pairs 60, the emitting sheet 62 is suitably cut into segments. Inserts 68 composed of a suitable insulating material, such as ceramic, are disposed between segments of the emitting sheet 62 and are sealed gas-tight to the emitting sheet 62 to maintain the parts of the solar power source in position and also to provide a gas-tight lower surface.

A plurality of cooling fins 70 are connected to the emitting sheet 62 to increase the radiation therefrom. Preferably, for the best operation on earth, the emitting sheet 62 including the fins 70 is provided with a larger outer surface area (e.g. approximately three times) than the outer surface area of the absorbing sheet 52.

To prevent the hot junction of the thermoelectric elements 60 from being cooled by convection, the absorbing sheet 52 and the thermoelectric elements 60 are enclosed in a gas-tight, transparent envelope 72 which is suitably evacuated. The emitting sheet 62 is not enclosed since convection of the earth's atmosphere aids in the emission of heat therefrom.

The thermoelectric elements 60 are connected to an external load (not shown) through conductors 74.

In one embodiment of a solar power source designed for use in the earth's atmosphere, the absorbing sheet 52 included a 0.025 centimeter thick copper sheet which was coated on one side with molybdenum approximately $0.1 \times 10^{-4}$ centimeter thick and on the other side with a thin evaporated coating of aluminum. The emitting sheet 62 included a 0.025 centimeter thick cooper sheet coated on one side with a thin coating of polished aluminum. Sufficient cooper fins were attached to the other side of the copper sheet to provide the emitting sheet 62 with three times the surface area of the absorbing sheet 52. Two pairs of thermoelectric elements were disposed in series 6 centimeters apart and were composed of a mixture comprising approximately 80 to 90 percent of tetradymite ($Bi_2Te_3$) and substantially the remainder being castillite ($Bi_2Se_3$). The mixture was doped with bismuth to provide n-type elements and copper bromide to provide p-type elements. The elements 60 were in the form of cubes of 0.3 centimeter on a side.

Various changes and modifications may be made in the above described solar power source without departing from the spirit or scope of this invention.

Various features of the invention are set forth in the accompanying claims.

I claim:

1. A power source for effecting the direct conversion of solar energy to electrical energy, which comprises a multilayer absorptive plate for converting incident solar energy to thermal energy; a multilayer radiating plate situated in parallel spaced relation to said absorptive plate and proportioned so that the surface area thereof is substantially larger than the surface area of said absorptive plate; said absorptive plate including an inner layer, which faces said radiating plate and which has low thermal emissivity and a high coefficient of thermal conductivity, and an outer layer having high absorptivity for the solar spectrum and low thermal emissivity; said multilayer radiating plate including an inner layer, which faces the inner layer of said absorptive plate and has low thermal emissivity and a high coefficient of thermal conductivity, and an outer supporting layer having high thermal emissivity; and at least one pair of n and p types semiconductor elements extending between, and thermally connected to the inner layers of said plates so that thermal energy can be conducted therethrough from said absorptive plate to said radiating plate thereby establishing an electrical potential gradient thereacross, adjacent ends of said pair of semiconductor elements being maintained in electrical contact at the inner layer of one of said plates and electrically insulated at the inner layer of the other of said plates.

2. A power source for effecting the direct conversion of solar energy to electrical energy, which comprises a multilayer absorptive plate for converting incident solar energy to thermal energy; a multilayer radiating plate situated in parallel spaced relation to said absorptive plate and proportioned so that the surface area thereof is substantially larger than the surface area of said absorptive plate; said absorptive plate including an inner layer, which is exposed to said radiating plate and which has low thermal emissivity and a high coefficient of thermal conductivity, an intermediate supporting layer having a high coefficient of thermal conductivity, and an outer layer having high absorptivity for the solar spectrum and low thermal emissivity; said multilayer radiating plate including an inner layer, which faces the inner layer of said absorptive plate and has low thermal emissivity and a high coefficient of thermal conductivity, and an outer supporting layer having high thermal emissivity; at least one pair of n and p type semiconductor elements extending between, and thermally connected to, the inner layers of said plates so that thermal energy can be conducted from said absorptive plate to said radiating plate thereby establishing an electrical potential gradient thereacross, adjacent ends of said pair of semiconductor elements being maintained in electrical contact at the inner layer of one of said plates and electrically insulated at the inner layer of the other of said plates; means defining an evacuated chamber; and means for supporting said multilayer absorptive plate and said semiconductor elements within said chamber.

3. A solar power source comprising a sheet of thermally stable, structural material having one side thereof coated with molybdenum which has high absorptivity for solar radiation a second sheet of thermally stable, structural material spaced from the other side of said first sheet, the opposed sides of said sheets being coated with aluminum, said second sheet being folded so that its outer surface area is at least twice the outer surface area of said first sheet, a plurality of p-type and n-type thermoelectric semiconductors extending between said aluminum coatings, said semiconductors being arranged in a plurality of parallel rows of alternating p-type and n-type semiconductors, said aluminum coatings being separated into strips which connect said semiconductors into at least one series circuit of alternating p-type and n-type semiconductors, conductors paralleling said strips, and additional conductors connecting the ends of the series connection to an external load.

4. A solar power source comprising a sheet of copper having one side thereof coated with molybdenum which has high absorptivity for solar radiation, a second sheet of copper spaced from the other side of said first sheet, the opposed sides of said sheets being coated with aluminum, a plurality of copper fins extending outwardly from said second sheet, said fins having an area equal to twice the area of the outer surface of said first sheet, a plurality of p-type and n-type thermoelectric semiconductors extending between said aluminum coatings, said semiconductors being arranged in a plurality of parallel rows of alternating p-type and n-type semiconductors, said sheets and associated coatings being separated into strips which connect into at least one series circuit alternating p-type and n-type semiconductors, conductors for connecting said series connection to an external load, and a gas-tight, evacuated, transparent container enclosing said first sheet and the thermoelectric semiconductors.

References Cited in the file of this patent

UNITED STATES PATENTS

| | | |
|---|---|---|
| 527,379 | Severy | Oct. 9, 1894 |
| 1,077,219 | Coblentz | Oct. 28, 1913 |
| 1,848,655 | Petrik | Mar. 8, 1932 |
| 2,671,818 | Turck | Mar. 9, 1954 |
| 2,864,879 | Toulmin | Dec. 16, 1958 |
| 2,886,618 | Goldsmid | May 12, 1959 |
| 2,903,857 | Lindenblad | Sept. 15, 1959 |